Jan. 6, 1959 D. M. POTTS 2,867,420
ELECTRIC DOUBLE BOILER
Filed May 10, 1957 2 Sheets-Sheet 1
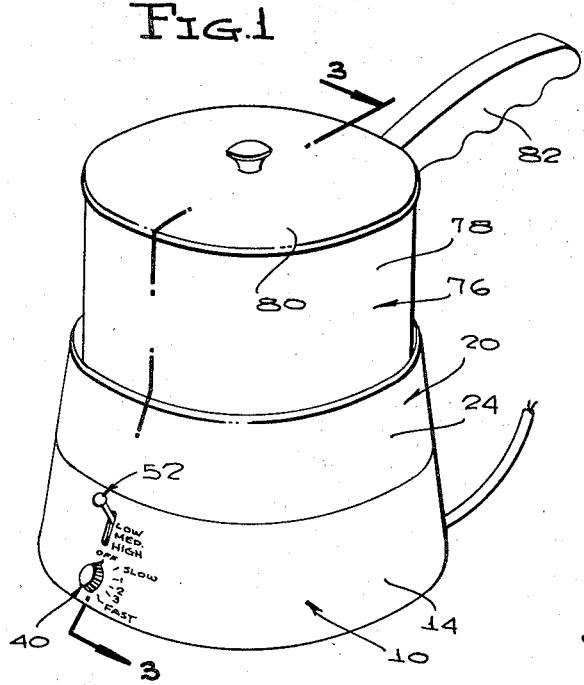
Fig. 1
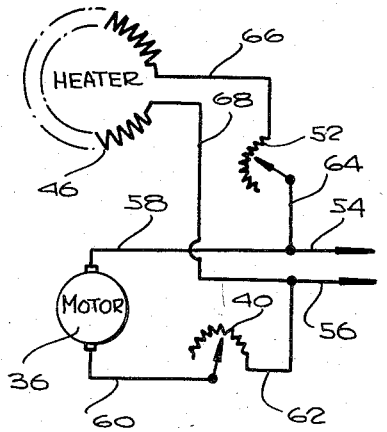
Fig. 2
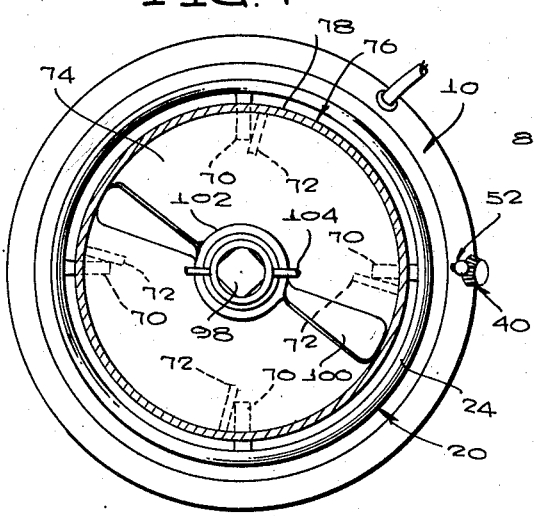
Fig. 4
Fig. 5
INVENTOR.
DONALD M. POTTS
BY
McMorrow, Berman & Davidson
ATTORNEYS Jan. 6, 1959 D. M. POTTS 2,867,420
ELECTRIC DOUBLE BOILER
Filed May 10, 1957 2 Sheets-Sheet 2

INVENTOR.
DONALD M. POTTS
BY
McMorrow, Berman & Davidson
ATTORNEYS

United States Patent Office 2,867,420
Patented Jan. 6, 1959

2,867,420

ELECTRIC DOUBLE BOILER

Donald M. Potts, Los Angeles, Calif.

Application May 10, 1957, Serial No. 658,304

1 Claim. (Cl. 259—108)

This invention relates to culinary vessels, and more particularly, has reference to an electrically operated double boiler including means for agitating or blending the contents during the heating of the same.

The main object of the present invention is to provide a generally improved device of the character described, so designed as to facilitate manufacture at low cost, while at the same time achieving more efficient heating and blending than has heretofore been the case.

Another object is to so design the device that the base portion thereof, containing the heating means, can be used independently of the rotary agitator and upper container, as a support for a sterilizing tray, thus adapting the device for use as a sterilizer.

Another object is to facilitate the swift conversion of the device from a double boiler to a sterilizer, and vice versa.

A further object is to eliminate the inconvenience and excessive loss of time presently required by a housewife, restaurant cook, or other person responsible for cooking, which loss of time and inconvenience results from the present necessity of standing at a stove, constantly stirring the contents of a pot while the same is being heated.

A further object is to facilitate the removal of the container holding the liquid that is being heated, with the removal of the container or pot automatically disengaging the agitator from the drive means therefor, so that the pot can if desired be removed while the agitator is still rotating.

A further object is to permit the lower portion or base of the device, in which the heating and drive means is contained, to be adapted to itself constitute a receptacle for liquids, so that, for example, water can be heated in the base for the purpose of creating steam to sterilize nursing bottles, etc.

Still another object of importance is to provide means in the base which will serve as a support either for the pot having the rotary agitator, or alternatively, for a sterilizing tray, said means being at the same time designed as a stop tending to prevent bodily rotation of the pot when torque is created during driving of the agitator.

Other objects will appear from the following description, the claim appended thereto, and from the annexed drawing, in which like reference characters designate like parts throughout the several views, and wherein:

Figure 1 is a perspective view of a combination double boiler and sterilizer according to the invention;

Figure 2 is a wiring diagram of the device;

Figure 4 is a transverse sectional view on a scale reduced slightly below that of Figure 3, taken on line 4—4 of Figure 3;

Figure 5 is a fragmentary transverse sectional view, on the same scale as Figure 3, taken substantially on line 5—5 of Figure 3.

Figures 3, 6:
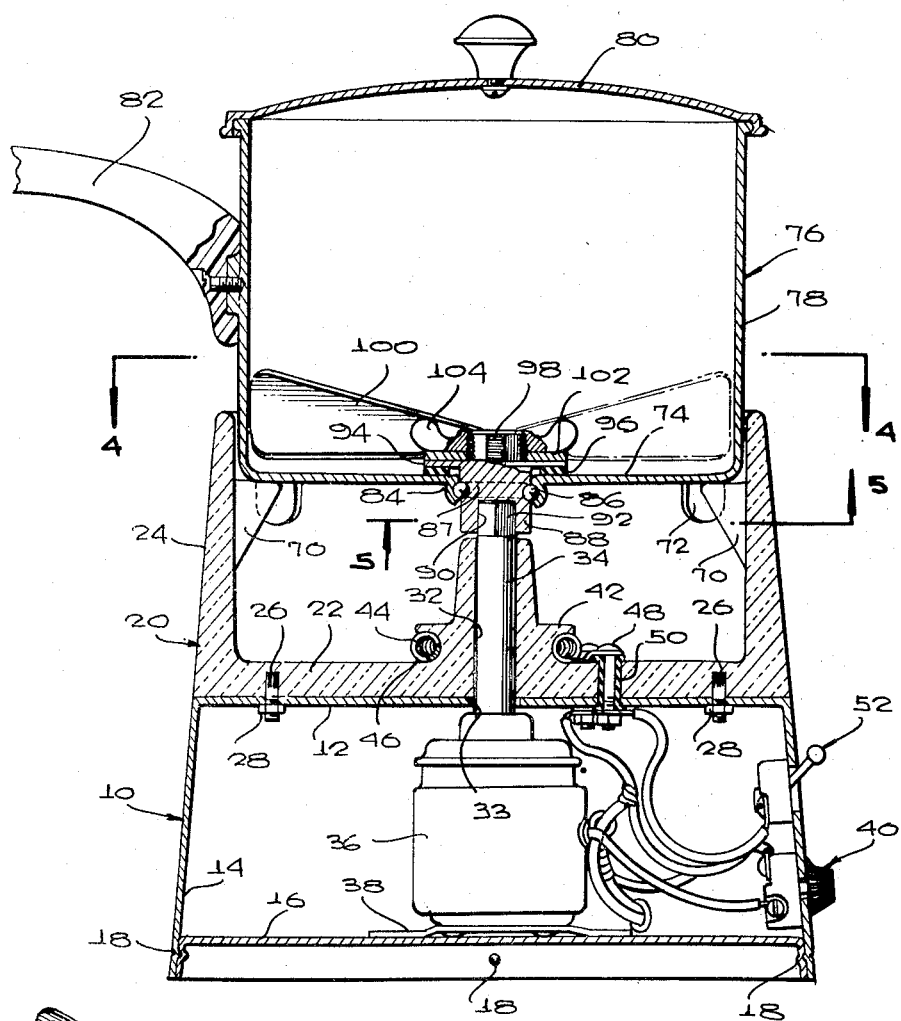
Figure 3 is an enlarged longitudinal sectional view through the device substantially on line 3—3 of Figure 1.
Figure 6 is a perspective view of a modified form of agitator blade usable interchangeably with the blade shown in Figures 3 and 4.

Referring to the drawings in detail, the invention includes a base generally designated 10, said base having an upper portion of porcelain or similar material, and a lower support portion formed of metal or the like, in a preferred embodiment.

Considering first the construction of the lower portion, this includes a flat, circular, horizontal plate 12 integrally formed at its periphery with a depending, downwardly flaring side wall 14. Closing the lower end of the lower portion is a bottom plate 16 having a depending peripheral flange connected with the side wall 14, through the medium of angularly spaced crimps spotted wherever desired about the circumference of the base. Equivalent means can be employed, of course, for connecting the plate 16 to the side wall 14.

The upper portion 20 of the base is formed to include a bottom wall 22 of a diameter corresponding to that of the top wall 12 of the lower portion. Bottom wall 22 is seated upon wall 12 as shown in Figure 3 and is integral at its periphery with an upwardly projecting side wall 24. An annular series of studs 26 embedded in wall 22 is provided, said studs extending through openings of wall 12 and recieving nuts 28 for fixedly connecting the upper and lower portions of the base together.

Integrally formed upon the center portion of the bottom wall 22 is an upwardly projecting, tapering boss 30, having an axial bore 32 registering with a center opening 33 of the plate 12. Extending within and rotating in the bore 32 is the shaft 34 of a vertically disposed electric motor 36 attached to a bracket 38 that is secured to the bottom plate 16.

A rheostatic switch 40 controls operation of the motor, so that the motor may be not only turned off or on by means of the switch, but also operated at any of a plurality of speeds (see Figure 1).

Also integrally formed upon the bottom wall 22, at the base of the boss 30, is a shoulder 42 in which there is formed an outwardly opening, continuous, circumferential groove 44 in which is fixedly mounted an immersion type electrical heater or resistance element 46 the opposite ends of which are connected to terminal screws or binding posts 48 (Figure 3), that extend downwardly through openings in the bottom wall 22 and are sealably encased in electrical insulation sleeves 50. The binding posts are provided with nuts at their lower ends, for attaching to the posts leads provided in the circuit (see Figure 2).

Referring now to Figure 2, there is here shown the circuit employed in the device. At 54, 56 are the leads extending to a source of electricity. Connected to lead 54 is a lead 58 to one side of the motor, from the other side of which extends a lead 60 extending to one terminal of the switch 40. From the other terminal of the switch extends a lead 62 connected to the lead 56.

Thus, on closing of the switch 40, the current flows as follows: lead 54, lead 58, motor 36, lead 60, switch 40, lead 62 and return to the source through lead 56.

Also connected to lead 54 is a lead 64, connected to one terminal of a rheostatic switch 52, controlling operation of the heating element, and disposed adjacent the switch 40 as shown in Figure 1. From the other terminal of switch 52 there extends a lead 66 to one end of the heater element 46, from the other end of which extends a lead 68 connected to the lead 56. On closing of switch 52, the heating element is energized, as will be readily understood by reference to the wiring diagram. Thus, the heating element and the motor are separately energized, and are operated in a controlled fashion so as to cause the motor to operate only at a particular, desired speed, with the heating element being energized to produce only a particular, desired amount of heat.

Referring to Figures 3 and 5, integrally formed upon the inner surface of the side wall 24, at locations spaced downwardly a substantial distance from the top of the side wall, are uniformly, angularly spaced, radially inwardly extending abutments 70, adapted to be engaged by depending ears 72 rigidly connected to the flat, circular bottom 74 of a container generally designated 76, having also a side wall 78 extending upwardly from the bottom 74. Container 76 includes a lid 80 normally closing the same, and a handle 82 facilitating the manipulation of the container.

Referring to Figures 3 and 5, the bottom wall 74 of the container is centrally apertured, and extending about the edge of the aperture is a depending, internally grooved flange 84, the groove of the flange being adapted to receive ball elements 86, which are in turn freely rotatable in an outwardly facing, circumferential groove 87 of a stub shaft 88 extending downwardly through the center opening of the bottom wall 74. Shaft 88 at its lower extremity has a downwardly opening, axial recess 90. This has a symmetrically star-shaped cross-section as shown in Figure 5. It receives an axial extension 92 formed upon shaft 34, having a square cross section. Thus, the container can be lifted bodily off the extension 92, for pouring of the container contents, washing of the container, etc. The stub shaft 88 is of course permanently associated with the container as will be readily noted from Figure 3.

The stub shaft 88, within the container, has an outwardly directed, planiform flange 94, the plane of which is parallel to the plane of the bottom 74. A gasket 96 of annular formation is interposed between the flange 94 and the bottom 74, so as to prevent leakage of the container contents into the hollow upper portion 20 of the base. However, should leakage occur, this will not be particularly harmful in view of the fact that the heating element and the various wiring connections are all designed so as to be either unaffected by the presence of liquid or moisture, or alternatively, fully protected against said presence of moisture. It will be understood, in this regard, that the gasket will be so designed as to prevent leakage while at the same time permitting free rotation of the stub shaft 88 within the container 76.

Integrally formed upon the upper end of the stub shaft 88 is an axial extension 98, which is of substantially rectangular cross section with rounded, threaded corners.

An agitator blade 100, having oppositely pitched blade members increased progressively in width in a direction toward their outer ends, is formed medially between its ends with a flat hub 102 having a substantially square center opening receiving the extension 98, so that the agitator blade will rotate with said extension during operation of the motor. A wing nut 104 is threaded onto the extension 98, bearing against the agitator blade to detachably hold the same assembled with the stub shaft.

In the form of the invention shown in Figures 1-5, the blade is imperforate. However, in a commercial embodiment, the blade would more likely be perforated as shown in Figure 6 at 106, including a hub 108 and a pair of blade members which are formed similarly to the blade members shown in Figure 3, but are freely perforated as at 110 over the full area. The modified agitator blade 106 can be used interchangeably with the blade 100, as will be understood, and has the desirable characteristic of blending the contents of the container rapidly and efficiently, while at the same time preventing excessive turbulence of the contents during operation of the device.

If desired, one can remove the container 76 even though the stub shaft 88 is still being rotated with the motor shaft 34. As soon as the container is lifted out of engagement with the motor shaft, the blade will stop rotating.

When it is desired to use the device as a sterilizer, the pot 76 is removed. A perforated tray, not shown, is then placed upon the lugs 70, to close the upwardly opening recess of the base. Then, the heating element is energized, it being understood that a suitable quantity of water would first have been poured into the base before the sterilizer tray is positioned thereon.

The items to be sterilized would be placed upon the tray, in any suitable arrangement, that is, nursing bottles would be inverted, etc., in the usual manner. Thereafter, a dome-shaped cover, not shown, would be positioned upon the tray so as to rest upon the fins or lugs 70. With the heating element energized at its maximum rating or wattage, steam will eventually be produced, efficiently sterilizing the item supported upon the tray.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A combination blender and double boiler comprising a base having an upwardly opening recess and formed with an upwardly projecting boss centered in the recess and having at its lower end, a circumferential groove, said boss being formed with an axial bore; heating means in the form of an annular electrical resistance engaged in said groove and exposed within the recess; a container removably supported in the recess; an agitator rotatably mounted in the container; and means in the bore for driving the agitator and connectable drivingly to the agitator responsive to positioning of the container on the base.

References Cited in the file of this patent

UNITED STATES PATENTS

| | | |
|---|---|---|
| 268,852 | Barlow | Dec. 12, 1882 |
| 1,420,773 | Stainbrook | June 27, 1922 |
| 2,028,595 | Flegel | Jan. 21, 1936 |
| 2,278,125 | Landgraf | Mar. 31, 1942 |
| 2,527,430 | Kniveton | Oct. 24, 1950 |

FOREIGN PATENTS

| | | |
|---|---|---|
| 81,235 | Switzerland | Oct. 16, 1919 |